US012705973B2

(12) United States Patent
Zeiynali Farid et al.

(10) Patent No.: US 12,705,973 B2
(45) Date of Patent: Aug. 11, 2026

(54) METHODS AND SYSTEMS FOR ESTIMATING LANE-LEVEL TRAFFIC JAM USING LANE CHANGE SIGNALS OF CONNECTED VEHICLES

(71) Applicant: Toyota Motor Engineering & Manufacturing North America, Inc., Plano, TX (US)

(72) Inventors: Yashar Zeiynali Farid, San Jose, CA (US); Emrah Akin Sisbot, Menlo Park, CA (US); Divya Sai Toopran, San Jose, CA (US); Kentaro Oguchi, Sunnyvale, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 209 days.

(21) Appl. No.: 18/626,706

(22) Filed: Apr. 4, 2024

(65) Prior Publication Data

US 2025/0316160 A1 Oct. 9, 2025

(51) Int. Cl.
*G08G 1/01* (2006.01)

(52) U.S. Cl.
CPC ......... *G08G 1/0125* (2013.01); *G08G 1/0112* (2013.01); *G08G 1/0141* (2013.01)

(58) Field of Classification Search
CPC ........................... G08G 1/0125; G08G 1/0112
See application file for complete search history.

(56) References Cited

U.S. PATENT DOCUMENTS

| | | | | |
|---|---|---|---|---|
| 10,424,195 | B2 | 9/2019 | Kim et al. | |
| 10,891,854 | B2 | 1/2021 | Oyama | |
| 11,127,292 | B2 * | 9/2021 | Bai | G05D 1/0248 |
| 11,156,468 | B2 | 10/2021 | Lee et al. | |
| 11,460,312 | B2 * | 10/2022 | Fowe | G01C 21/3492 |
| 12,005,925 | B1 * | 6/2024 | Gogna | B60W 60/0011 |
| 2009/0292456 | A1 * | 11/2009 | Inoguchi | G08G 1/0969 701/118 |
| 2016/0335890 | A1 * | 11/2016 | Bernhardt | G01C 21/3492 |
| 2018/0033296 | A1 * | 2/2018 | Fowe | G01C 21/3691 |
| 2018/0158326 | A1 * | 6/2018 | Fowe | G08G 1/0112 |
| 2018/0182238 | A1 * | 6/2018 | Fowe | G08G 1/0112 |
| 2019/0329770 | A1 * | 10/2019 | Rajab | H04W 4/46 |
| 2020/0025584 | A1 * | 1/2020 | Fowe | G01C 21/3492 |
| 2020/0124438 | A1 * | 4/2020 | Fowe | G01C 21/3469 |

(Continued)

FOREIGN PATENT DOCUMENTS

| | | | |
|---|---|---|---|
| CN | 111439261 | B | 7/2023 |
| EP | 2966590 | B1 | 4/2023 |
| JP | 4728315 | B2 | 7/2011 |

*Primary Examiner* — Jess Whittington
(74) *Attorney, Agent, or Firm* — DINSMORE & SHOHL LLP

(57) ABSTRACT

A system for estimating a lane-level traffic jam is provided. The system includes one or more processors programmed to obtain information on lane changes of the vehicles in a road section including a traffic jam section, the road section including a plurality of lanes; collect driving data of the vehicles after the lane changes; estimate lane-level traffic jam distribution of the plurality of lanes based on the information on the lane changes and the driving data; and transmit the lane-level traffic jam distribution to vehicles approaching the traffic jam section.

18 Claims, 12 Drawing Sheets

(56) References Cited

U.S. PATENT DOCUMENTS

| | | | | |
|---|---|---|---|---|
| 2020/0234585 | A1* | 7/2020 | Bai | G08G 1/096725 |
| 2020/0380270 | A1* | 12/2020 | Cox | G06F 18/2413 |
| 2021/0302960 | A1* | 9/2021 | Mcgill, Jr. | G06N 3/0455 |
| 2021/0354690 | A1* | 11/2021 | Yershov | G06V 20/56 |
| 2022/0207995 | A1* | 6/2022 | Fowe | G06F 16/29 |
| 2023/0134612 | A1 | 5/2023 | Zeiynali Farid et al. | |
| 2023/0136374 | A1 | 5/2023 | Zeiynali Farid et al. | |
| 2023/0179604 | A1* | 6/2023 | Adcock | H04L 63/101 726/4 |
| 2023/0204378 | A1* | 6/2023 | Fowe | G08G 1/0129 701/450 |
| 2023/0326334 | A1* | 10/2023 | Zhang | G08G 1/0962 340/934 |
| 2024/0210942 | A1* | 6/2024 | Pronovost | G06N 3/045 |
| 2025/0171016 | A1* | 5/2025 | Garimella | B60W 30/09 |
| 2025/0198797 | A1* | 6/2025 | Orendovici | G01C 21/3841 |

* cited by examiner

METHODS AND SYSTEMS FOR ESTIMATING LANE-LEVEL TRAFFIC JAM USING LANE CHANGE SIGNALS OF CONNECTED VEHICLES

TECHNICAL FIELD

The present specification relates to systems and methods for estimating lane-level traffic jam, and more particularly, estimating lane-level traffic jam using lane change signals of connected vehicles.

BACKGROUND

Lane-level traffic, in which average speed of vehicles in different lanes vary, can increase crash risk, especially rear-end crashes. In addition, if there are different traffic levels in different levels, drivers may miss the back of a traffic jam queue and try to cut in. Existing navigation systems do not provide lane-level traffic. For example, when an exit to the right is congested, the existing navigation systems do not show the congested right lane, and show the whole road section without traffic due to driving data of vehicles that drive in normal speeds in other lanes.

Accordingly, a need exists for systems and methods for accurately estimating lane-level traffic information.

SUMMARY

The present disclosure provides systems and methods for estimating traffic jam lane using lane change signals of connected vehicles.

In one embodiment, a system for estimating a lane-level traffic jam is provided. The system includes one or more processors programmed to obtain information on lane changes of the vehicles in a road section including a traffic jam section, the road section including a plurality of lanes; collect driving data of the vehicles after the lane changes; estimate lane-level traffic jam distribution of the plurality of lanes based on the information on the lane changes and the driving data; and transmit the lane-level traffic jam distribution to vehicles approaching the traffic jam section.

In another embodiment, a method for determining a lane-level traffic jam is provided. The method includes obtaining information on lane changes of the vehicles in a road section including a traffic jam section, the road section including a plurality of lanes; collecting driving data of the vehicles after the lane changes; estimating lane-level traffic jam distribution of the plurality of lanes based on the information on the lane changes and the driving data; identifying a lane with a traffic jam based on the lane-level traffic jam distribution; and transmitting information on the identified lane to vehicles approaching the traffic jam section.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1A:
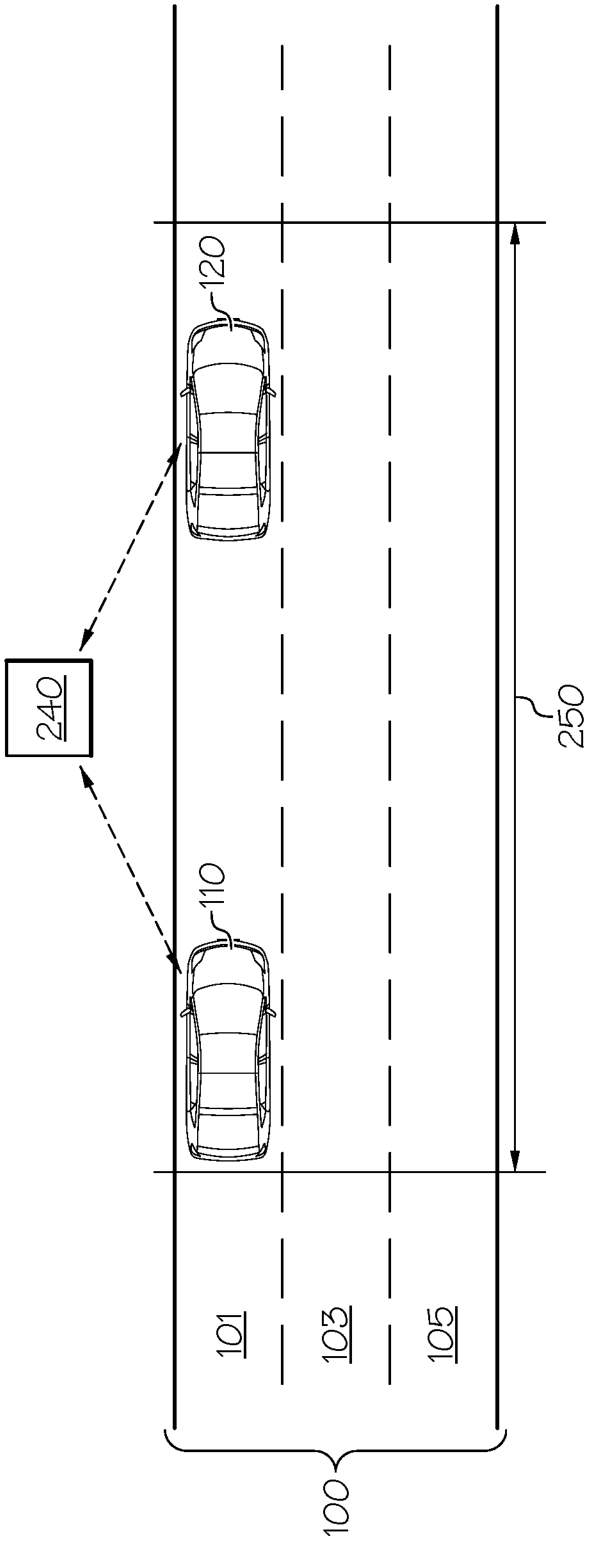
FIG. 1A schematically depicts a system for estimating lane-level traffic jam using lane change signals of connected vehicles, according to one or more embodiments shown and described herein.

The embodiments disclosed herein include systems and methods for estimating lane-level traffic jam, according to one or more embodiments shown and described herein. In particular, as used herein, the lane-level traffic jam indicates a situation where the average speed of vehicles in one lane of a road is substantially different from the average speed of vehicles in another lane of the road. More specifically, the lane-level traffic jam may indicate a situation in which the average speed of vehicles in one lane of a road in a particular region varies by more than a threshold amount from the average speed of vehicles in another lane of the road within the particular region.

When lane-level traffic jam occurs, it may lead to inefficient or dangerous driving conditions. As such, it may be desirable to detect lane-level traffic jam. If lane-level traffic jam can be detected, drivers and autonomous vehicles may be warned about the lane-level traffic jam. As such, these drivers or autonomous vehicles may plan a navigation route in consideration of the lane-level traffic jam. For example, a driver may avoid an area that has lane-level traffic or may change lanes before reaching the lane-level traffic jam.

Many modern vehicles are connected vehicles, meaning they are able to transmit and/or receive data to or from external computing devices (e.g., other vehicles, traffic infrastructure, edge servers, or a cloud server). As such, if a cloud server or other computing device receives driving data from a number of connected vehicles, the cloud server may use the received driving data to determine traffic information based on the aggregated driving data. However, while many vehicles are able to receive GPS data indicating their positions, GPS data is often noisy and not accurate enough to determine in which lane of a road a vehicle is located. As such, determining lane-level traffic directly from GPS data may not be possible In embodiments disclosed herein, a server obtains information on lane changes of the vehicles in a road section including a traffic jam section, e.g., the lane change of the vehicle 110 in FIG. 1B or the lane change of the vehicle 110 in FIG. 6. The server collects driving data of the vehicles after the lane changes, such as acceleration or deceleration. Then, the server estimates lane-level traffic jam distribution of the plurality of lanes of the road section such as the lane-level traffic jam distribution 140 in FIG. 1B or the lane-level traffic jam distribution 620 in FIG. 6 based on the information on the lane changes and the driving data. The server transmits the lane-level traffic jam distribution to vehicles approaching the traffic jam section such that the vehicles approaching the traffic jam section utilizes the lane-level traffic jam distribution to avoid the lane with the traffic jam.

According to the present disclosure, the present system identifies lane ID of a traffic jam by analyzing changes in the states of connected vehicles, e.g., from a congested state to a free flow state, and tracking lane changes of the connected vehicles in a road segment. The present system identifies lane ID of a traffic jam without requiring lane ID of vehicles.

FIG. 1A schematically depicts a system for estimating lane-level traffic jam using lane change signals of connected vehicles, according to one or more embodiments shown and described herein. In embodiments, a system includes first and second connected vehicles 110 and 120, and a server 240. The server 240 may be a local server including, but not limited to, roadside unit, an edge server, and the like. In some embodiments, the server 240 may be a remote server such as a cloud server.

Each of the first and second connected vehicles 110 and 120 may be a vehicle including an automobile or any other passenger or non-passenger vehicle such as, for example, a terrestrial, aquatic, and/or airborne vehicle. In some embodiment, one or more of the first and second connected vehicles 110 and 120 may be an unmanned aerial vehicle (UAV), commonly known as a drone.

The first and second connected vehicles 110 and 120 may be autonomous and connected vehicles, each of which navigates its environment with limited human input or without human input. The first and second connected vehicles 110 and 120 are equipped with internet access and share data with other devices both inside and outside the first and second connected vehicles 110 and 120. Each of the first and second connected vehicles 110 and 120 may include an actuator such as an engine, a motor, and the like to drive the vehicle. The first and second connected vehicles 110 and 120 may communicate with the server 240. The server 240 may communicate with vehicles in an area covered by the server 240. The server 240 may communicate with other servers that cover different areas. The server 240 may communicate with a remote server and transmit information collected by the server 240 to the remote server.

In FIG. 1A, the connected vehicles 110 and 120 are traveling on a road 100 including multiple lanes, e.g., lanes 101, 103, and 105. The connected vehicles 110 and 120 transmit to the server 240 their driving data that include, but not limited to, the locations, speeds, accelerations, orientations, wheel angles, blinker states and the like. While FIG. 1A depicts two connected vehicles 110 and 120, the server 240 may receive driving data from more than the two connected vehicles 110 and 120. Based on the driving data from connected vehicles, particularly, the speed of the connected vehicles, the server 240 may identify a traffic jam section 250 in the road 100.

The connected vehicles 110 and 120 may not be equipped with high precision GPS sensors, such that the connected vehicles 110 and 120 may not have information on which lane they are driving in. For example, the connected vehicle 110 has information that it is driving on the road 100, however, the connected vehicle 110 is not certain which of the lanes 101, 103, and 105 the connected vehicle 110 is taking. Similarly, the connected vehicle 120 is not certain about information on the lane-level trajectory. Thus, when the connected vehicles 110 and 120 transmit their driving data to the server 240, the driving data do not include lane ID information, i.e., the identification of the lane in which corresponding vehicle is driving. In this regard, although the server 240 may identify the traffic jam section 250, the server 240 cannot identify which lane includes a traffic jam and which lane does not include a traffic jam among the lanes 101, 103, and 105.

Figure 1B:
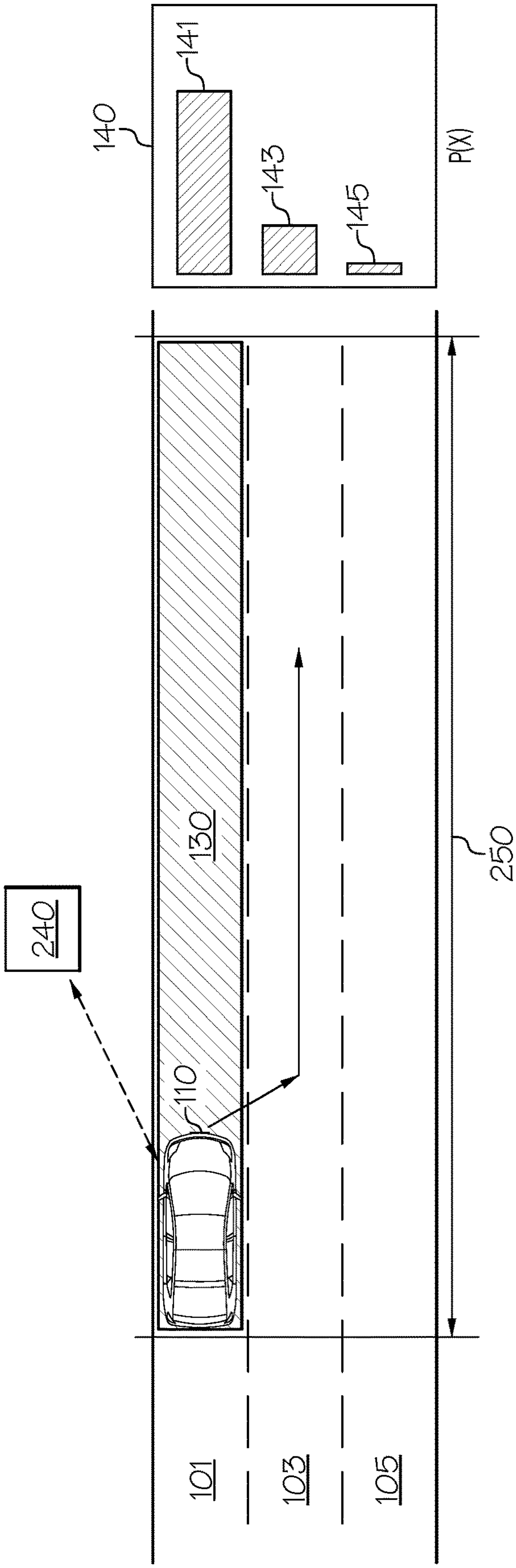
FIG. 1B depicts estimating a probability of traffic jam in each of the lanes using lane change signals of a connected vehicle, according to one or more embodiments shown and described herein.

In embodiments, the system may estimate lane-level traffic jam status using lane change signals of connected vehicles. FIG. 1B depicts estimating a probability of traffic jam in each of the lanes using lane change signals of a connected vehicle, according to one or more embodiments shown and described herein.

In FIG. 1B, the connected vehicle 110 is initially in traffic jam 130. The server 240 may determine that the connected vehicle 110 is in a traffic jam based on the speed of the connected vehicle 110. For example, the server 240 may determine that the connected vehicle 110 is in a traffic jam if the speed of the connected vehicle 110 is less than a threshold speed, e.g., 5 mph, 10 mph, 20 mph. As another example, the server 240 may determine that the connected vehicle 110 is in a traffic jam if the speed of the connected vehicle 110 is significantly deviated from the speed limit of the road 100, e.g., 20 mph, 30 mph less than the speed limit.

Although FIG. 1B depicts that the connected vehicle 110 is in the lane 101 and the traffic jam 130 is located in the lane 101, the connected vehicle 110 and the server 240 do not have information that the connected vehicle 110 and the traffic jam 130 are in the lane 101. The server 240 may monitor driving behavior of connected vehicles in the traffic jam section 250. For example, the server 240 receives driving data from the connected vehicle 110 that the connected vehicle 110 in a traffic jam changes lanes to the right and accelerates. The server 240 may monitor driving behavior of other connected vehicles in the traffic jam section 250 and receive no driving data indicating that a connected vehicle changes lanes to the left and accelerates during a certain period of time, e.g., several minutes.

Based on the driving data of connected vehicles in the traffic jam section 250, the server 240 may determine that the leftmost lane would have the highest probability of having corresponding traffic jam. Specifically, the server 240 may estimate lane-level traffic jam distribution 140 that includes a probability of traffic jam in each of the lanes 101, 103, 105. The server 240 may generate an initial lane-level traffic jam distribution that may have equal probability of traffic jam in each of the lanes 101, 103, 105 and update the initial lane-level traffic jam distribution based on the driving data of connected vehicles as the driving data are received from the connected vehicles. For example, as more connected vehicles transmit, to the server 240, driving data indicating that corresponding vehicle in a traffic jam changes lanes to the right and accelerates, the probability of traffic jam in the leftmost lane 141 relatively increases and the probability of traffic jam in the rightmost lane 145 relatively decreases. As the time period, during which the server 240 does not receive any driving data indicating that corresponding vehicle changes lanes to the left and accelerates, increases, the probability of traffic jam in the middle lane 143 relatively decreases.

The server 240 may transmit information about the updated lane-level traffic jam distribution to connected vehicles. In embodiments, the server 240 may transmit the information about the updated lane-level traffic jam distribution to connected vehicles approaching the traffic jam section 250, and the connected vehicles approaching the traffic jam section 250 may autonomously drive to divert the lane with a traffic jam. For example, if connected vehicles approaching the traffic jam section 250 are driving in the lane 101, the connected vehicles may change lanes to the right in advance to avoid being trapped in the traffic jam 130.

Figure 1C:
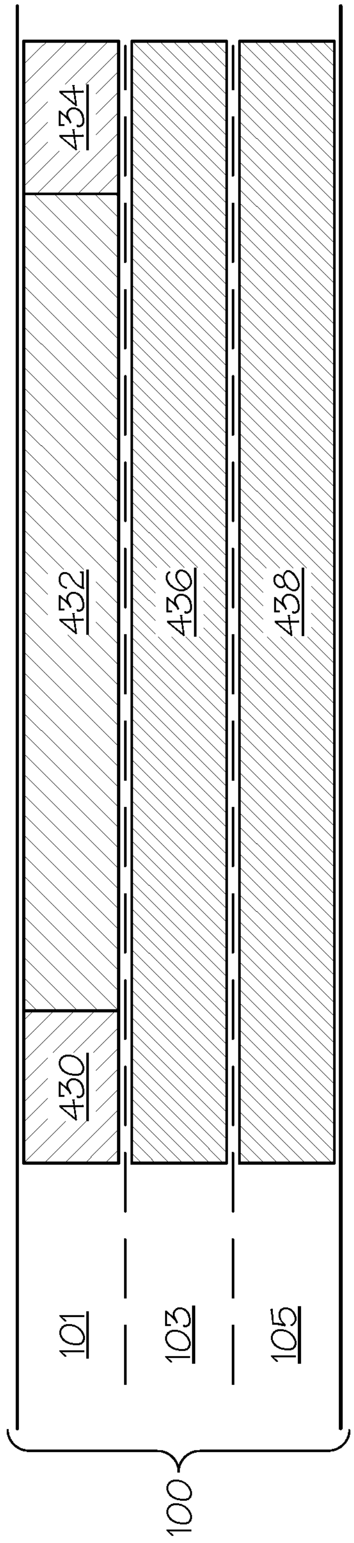
FIG. 1C illustrates an example lane-level traffic distribution image for a road, according to one or more embodiments shown and described herein.

In some embodiments, the connected vehicles that received the updated lane-level traffic jam distribution from the server 240 may display the lane-level traffic jam distribution on an output device, for example, the head-unit of the vehicle, or the navigation app of the smartphone of a user in the vehicle, as illustrated in FIG. 1C. FIC. 1C illustrates an example lane-level traffic distribution image for the road 100. The lane 101 includes the bars 430, 432, and 434. The bar 432 indicates traffic jam, the bars 430 and 434 indicate relatively slow driving sections. The lane 103 includes the bar 436 and the lane 105 includes the bar 438. The bars 436 and 438 indicate lanes without a traffic jam.

Figure 2:
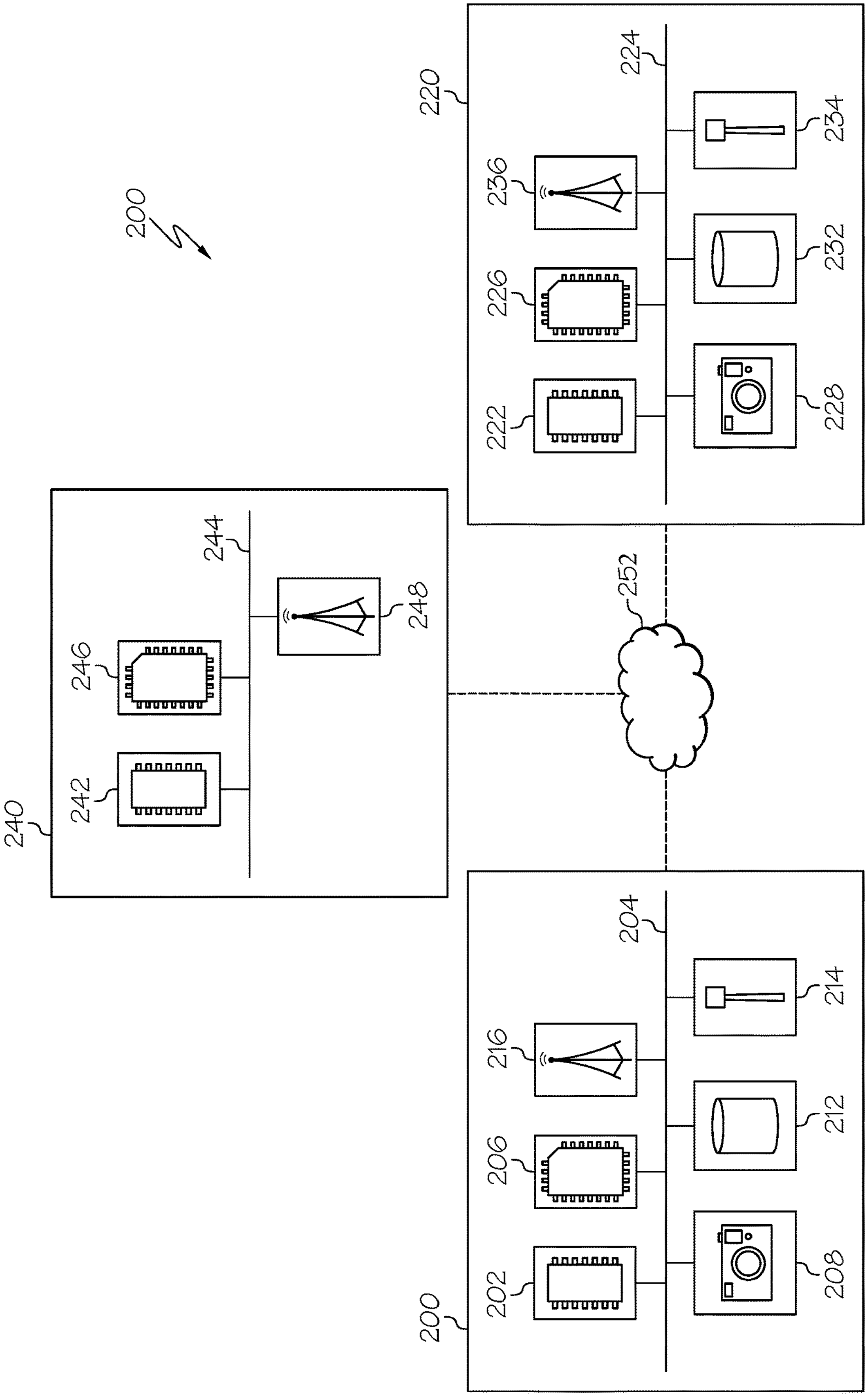
FIG. 2 schematically depicts a system for estimating lane-level traffic jam using lane change signals of connected vehicles, according to one or more embodiments shown and described herein.

FIG. 2 schematically depicts a system for estimating lane-level traffic jam using lane change signals of connected vehicles, according to one or more embodiments shown and described herein. The system for estimating traffic jam lane includes a first connected vehicle system 200, a second connected vehicle system 220, and a server 240.

It is noted that, while the first connected vehicle system 200 and the second connected vehicle system 220 are depicted in isolation, each of the first connected vehicle system 200 and the second connected vehicle system 220 may be included within a vehicle in some embodiments, for example, respectively within each of the connected vehicles 110 and 120 of FIG. 1A. In embodiments in which each of the first connected vehicle system 200 and the second connected vehicle system 220 is included within a vehicle, the vehicle may be an automobile or any other passenger or non-passenger vehicle such as, for example, a terrestrial, aquatic, and/or airborne vehicle. In some embodiments, the vehicle is an autonomous vehicle that navigates its environment with limited human input or without human input.

The first connected vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The first connected vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 206 may include machine readable instructions that, when executed by the one or more processors 202, obtain information on lane changes of the vehicles in a road section including a traffic jam section, collect driving data of the vehicles after the lane changes, estimate lane-level traffic jam distribution of the plurality of lanes based on the information on the lane changes and the driving data, transmit the lane-level traffic jam distribution to vehicles approaching the traffic jam section.

Referring still to FIG. 2, the first connected vehicle system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may have any resolution. In some embodiments, one or more optical components, such as a mirror, fish-eye lens, or any other type of lens may be optically coupled to the one or more sensors 208. In some embodiments, the one or more sensors 208 may also provide navigation support. That is, data captured by the one or more sensors 208 may be used to autonomously or semi-autonomously navigate the connected vehicle 110.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein to develop a fuller real-time traffic image. Ranging sensors like radar may be used to obtain a rough depth and speed information for the view of the first connected vehicle system 200. The first connected vehicle system 200 may capture road boundaries, static objects, moving objects, and the like using one or more imaging sensors.

In operation, the one or more sensors 208 capture image data and communicate the image data to the one or more processors 202 and/or to other systems communicatively coupled to the communication path 204. The image data may be received by the one or more processors 202, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

The first connected vehicle system 200 comprises a satellite antenna 214 coupled to the communication path 204 such that the communication path 204 communicatively couples the satellite antenna 214 to other modules of the first connected vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The first connected vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring the orientation, acceleration, motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle. The one or more vehicle sensors 212 may include wheel sensors for detecting wheel angles.

Still referring to FIG. 2, the first connected vehicle system 200 comprises network interface hardware 216 for communicatively coupling the first connected vehicle system 200 to the second connected vehicle system 220 and/or the server 240. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the first connected vehicle system 200 may transmit its data to the server 240. For example, the network interface hardware 216 of the first connected vehicle system 200 may transmit captured point cloud generated by the first connected vehicle system 200, vehicle data, location data, and the like to other connected vehicles or the server 240.

The first connected vehicle system 200 may connect with one or more external vehicles and/or external processing devices (e.g., the server 240) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect (e.g., the network 252), which may be in lieu of, or in addition to, a direct connection (such as V2V or V2X) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the first connected vehicle system 200 may be communicatively coupled to the server 240 by the network 252. In one embodiment, the network 252 may include one or more computer networks (e.g., a personal area network, a local area network, or a wide area network), cellular networks, satellite networks and/or a global positioning system and combinations thereof. Accordingly, the first connected vehicle system 200 can be communicatively coupled to the network 252 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the server 240 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The communication path 244 may be similar to the communication path 204 in some embodiments.

The one or more memory modules 246 may include machine readable instructions that, when executed by the one or more processors 242, obtain information on lane changes of the vehicles in a road section including a traffic jam section, collect driving data of the vehicles after the lane changes, estimate lane-level traffic jam distribution of a plurality of lanes of the road section based on the information on the lane changes and the driving data, and transmit the lane-level traffic jam distribution to vehicles approaching the traffic jam section.

Still referring to FIG. 2, the second connected vehicle system 220 includes one or more processors 222, one or more memory modules 226, one or more sensors 228, one or more vehicle sensors 232, a satellite antenna 234, network interface hardware 236, and a communication path 224 communicatively connected to the other components of the second connected vehicle system 220. The components of the second connected vehicle system 220 may be structurally similar to and have similar functions as the corresponding components of the first connected vehicle system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 232 corresponds to the one or more vehicle sensors 212, the satellite antenna 234 corresponds to the satellite antenna 214, the network interface hardware 236 corresponds to the network interface hardware 216, and the communication path 224 corresponds to the communication path 204).

The one or more memory modules 226 may include machine readable instructions that, when executed by the one or more processors 222, obtain information on lane changes of the vehicles in a road section including a traffic jam section, collect driving data of the vehicles after the lane changes, estimate lane-level traffic jam distribution of a plurality of lanes of the road section based on the information on the lane changes and the driving data, and transmit the lane-level traffic jam distribution to vehicles approaching the traffic jam section.

Figure 3:
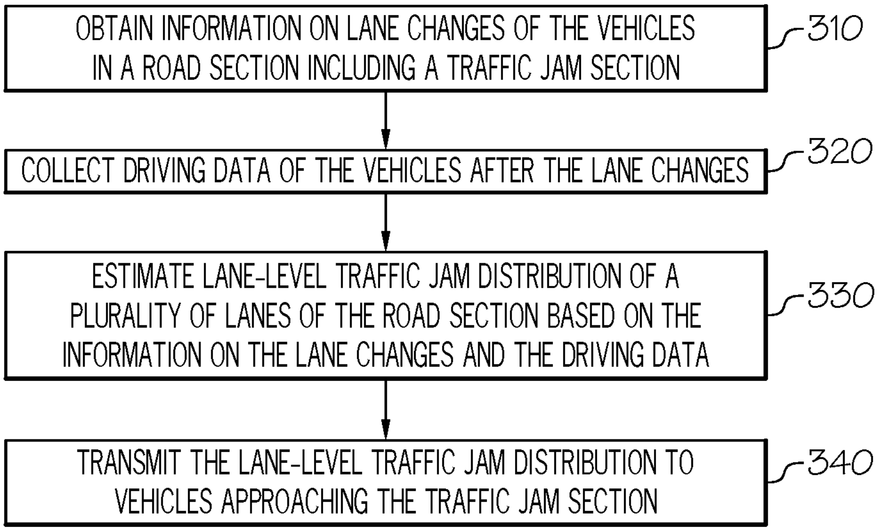
FIG. 3 depicts a flowchart for estimating lane-level traffic jam, according to one or more embodiments shown and described herein.

FIG. 3 depicts a flowchart for estimating lane-level traffic jam, according to one or more embodiments shown and described herein.

In step 310, the server obtains information on lane changes of the vehicles in a road section including a traffic jam section. By referring to FIG. 1A, the server 240 may retrieve map data for the road 100. The map data may indicate that the road 100 includes three lanes 101, 103, 105. The server may receive driving data from connected vehicles on the road 100, assign the locations of the connected vehicles to the map data, and identify the traffic jam section 250 based on the driving data of the connected vehicles including the speeds of the connected vehicles. The server 240 may detect the front and back of the traffic jam section based on the speeds of the connected vehicles and identify the traffic jam section spanning from the front to the back. For example, the front of the traffic jam may be the location of a connected vehicle that is located at the front among the connected vehicles whose speed is less than a threshold speed, e.g., 5 mph, 10 mph, 20 mph, etc. The back of the traffic jam may be the location of a connected vehicle that is located at the back among the connected vehicles whose speed is less than a threshold speed, e.g., 5 mph, 10 mph, 20 mph, etc.

The server 240 may communicate with the connected vehicles in the traffic jam section or near the traffic jam section and receive driving data including GPS coordinates, speeds, and signals that can be used to detect lane changes of the vehicles including wheel angles, accelerometers, lane crossings, blinker states. Based on the driving data, the server 240 may identify vehicles that change lanes in the traffic jam section or near the traffic jam section and obtain information on lane changes of the vehicles, such as the location of lane changes, the direction of the lane changes, and the like. For example, by referring to FIG. 1B, the server may determine that the connected vehicle 110 in the traffic jam section 250 changed lanes to the right based on the data such as wheel angle data, accelerometer data, lane crossing data, blinker state data, and the like.

Referring back to FIG. 3, in step 320, the server 240 collects driving data of the vehicles after the lane changes. For example, by referring to FIG. 1B, the server 240 identifies that the vehicle 110 changes lanes to the right, and continues to collect driving data of the vehicle 110 right after the lane changes. The driving data of the vehicle 110 may include acceleration or deceleration information. In this example, the server 240 collects driving data of the vehicle 110 indicating that the vehicle 110 changed lanes to the right and accelerated.

Referring back to FIG. 3, in step 330, the server 240 estimates lane-level traffic jam distribution of a plurality of lanes of the road section based on the information on the lane changes and the driving data. By referring to FIG. 1B, the server 240 may estimate lane-level traffic jam distribution 140 that includes a probability of traffic jam in each of the lanes 101, 103, 105. The server 240 may generate an initial lane-level traffic jam distribution that may have equal probability of traffic jam in each of the lanes 101, 103, 105 and update the initial lane-level traffic jam distribution based on the driving data of connected vehicles as they are received from the connected vehicles. For example, as more connected vehicles transmit, to the server 240, driving data indicating that corresponding vehicle in a traffic jam changes lanes to the right and accelerates, the probability of traffic jam in the leftmost lane 141 relatively increases and the probability of traffic jam in the rightmost lane 145 relatively decreases. As the time period, during which the server 240 does not receive any driving data indicating that corresponding vehicle changes lanes to the left and accelerates, increases, the probability of traffic jam in the middle lane 143 relatively decreases. If any vehicle changes lanes to the left and accelerates, it implies that the traffic jam may not be in the leftmost lane. Thus, if the server 240 does not receive any driving that indicating that corresponding vehicle changes lanes to the left and accelerates, it implies that the traffic jam is likely to be in the leftmost lane.

Referring back to FIG. 3, in step 340, the server may transmit the lane-level traffic jam distribution to vehicles approaching the traffic jam section. By referring to FIG. 1B, the server 240 may transmit the information about the updated lane-level traffic jam distribution to connected vehicles approaching the traffic jam section 250, and the connected vehicles approaching the traffic jam section 250 may autonomously drive to divert the lane with traffic jam. In some embodiments, the connected vehicles that received the updated lane-level traffic jam distribution from the server 240 may display lane-level traffic jam distribution on an output device, for example, the head-unit of the vehicle, or the navigation app of the smartphone of a user in the vehicle, as illustrated in FIG. 1C.

In some embodiments, the server 240 may identify a lane with a traffic jam based on the lane-level traffic jam distribution and transmit information on the identified lane to vehicles approaching the traffic jam section. For example, based on the lane-level traffic jam distribution 140, the server 240 identifies the lane 101 as the lane with the traffic jam and transmit the information about the lane 101 to connected vehicles approaching the traffic jam section 250.

Figure 4:
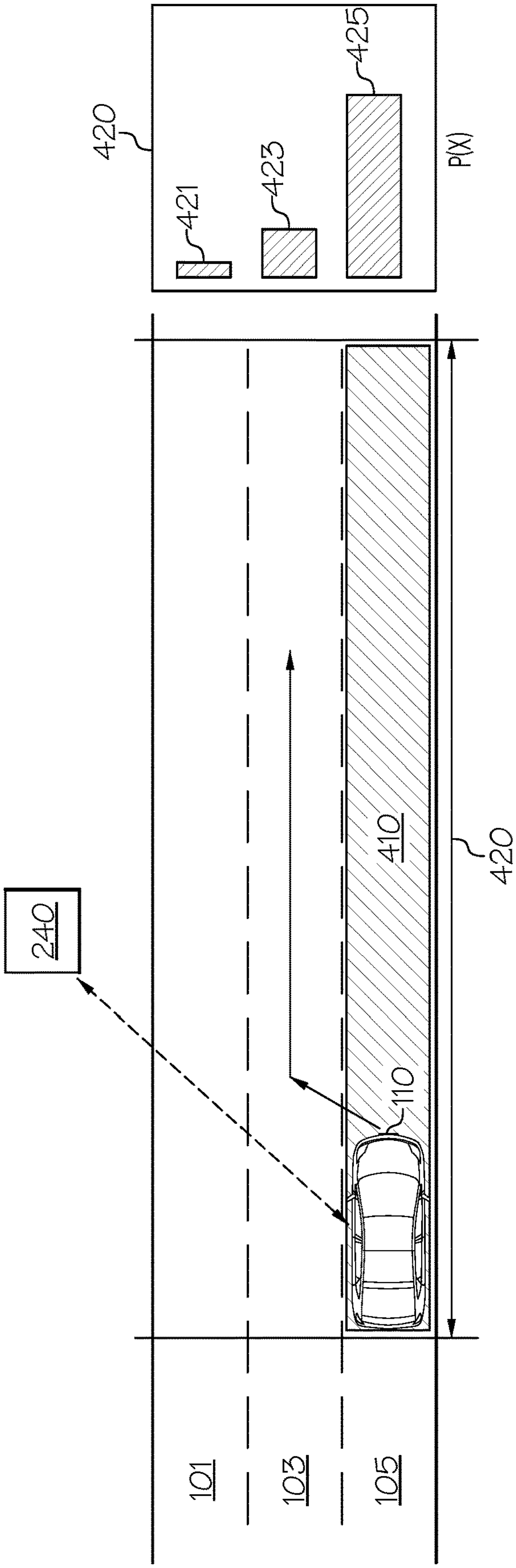
FIG. 4 depicts estimating a probability of traffic jam in each of the lanes using lane change signals of a connected vehicle, according to one or more embodiments shown and described herein.

FIG. 4 depicts estimating a probability of traffic jam in each of the lanes using lane change signals of a connected vehicle, according to one or more embodiments shown and described herein.

In FIG. 4, the connected vehicle 110 is initially in traffic jam 410. The server 240 may determine that the connected vehicle 110 is in a traffic jam based on the speed of the connected vehicle 110. Although FIG. 4 depicts that the connected vehicle 110 is in the lane 105 and the traffic jam 410 is located in the lane 105, the connected vehicle 110 and the server 240 do not have information that the connected vehicle 110 and the traffic jam 410 are in the lane 105. The server 240 may monitor driving behavior of connected vehicles in the traffic jam section 420. For example, the server 240 received driving data from the connected vehicle 110 that the connected vehicle 110 in a traffic jam changes lanes to the left and accelerates. The server 240 may monitor driving behavior of other connected vehicles in the traffic jam section 420 and receive no driving data indicating that a connected vehicle changes lanes to the right and accelerates.

Based on the driving data of connected vehicles in the traffic jam section 250, the server 240 may determine that the rightmost lane would have the highest probability of having corresponding traffic jam. Specifically, the server 240 may estimate lane-level traffic jam distribution 140 that includes a probability of traffic jam in each of the lanes 101, 103, 105. The server 240 may generate an initial lane-level traffic jam distribution that may have equal probability of traffic jam in each of the lanes 101, 103, 105 and update the initial lane-level traffic jam distribution based on the driving data of connected vehicles as the driving data are received from the connected vehicles. For example, as more connected vehicles transmit, to the server 240, driving data indicating that corresponding vehicle in a traffic jam changes lanes to the left and accelerates, the probability of traffic jam in the rightmost lane 425 relatively increases and the probability of traffic jam in the leftmost lane 421 relatively decreases. As the time period, during which the server 240 does not receive any driving data indicating that corresponding vehicle changes lanes to the right and accelerates, increases, the probability of traffic jam in the middle lane 423 relatively decreases. The server 240 may transmit information about the updated lane-level traffic jam distribution to connected vehicles.

Figure 5:
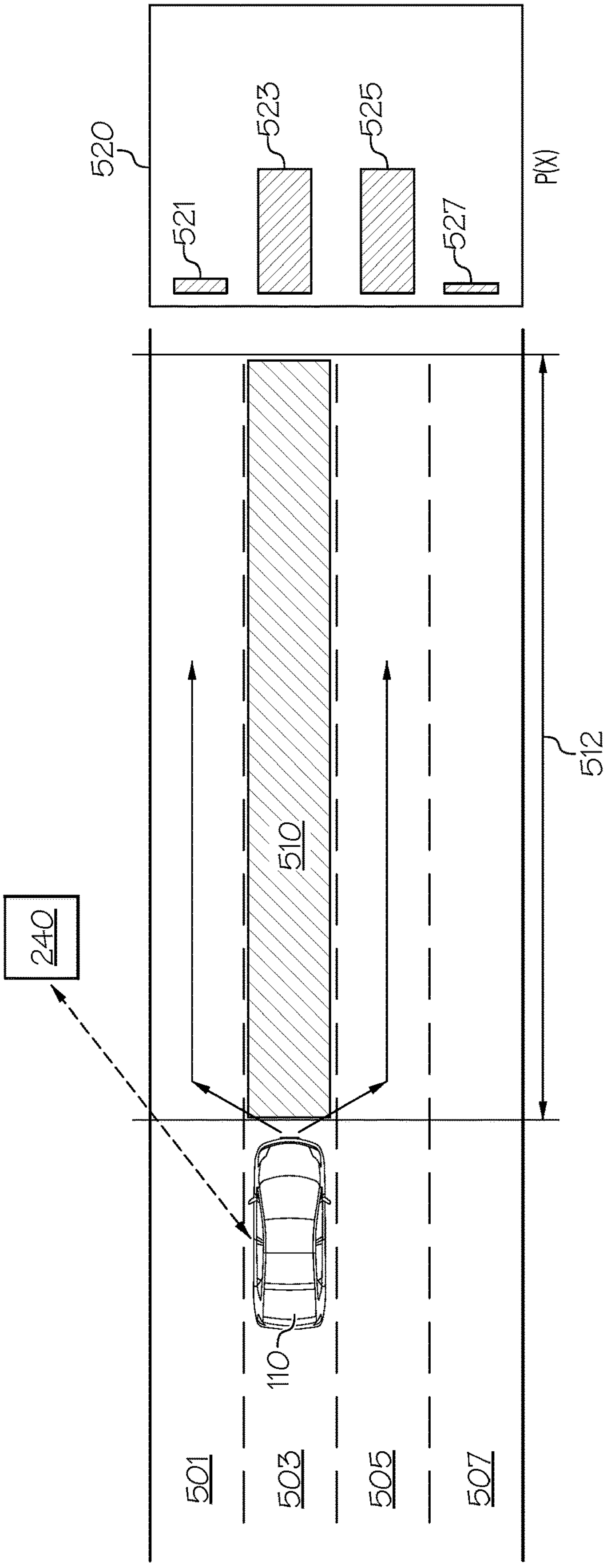
FIG. 5 depicts estimating a probability of traffic jam in each of the lanes using lane change signals of a connected vehicle, according to one or more embodiments shown and described herein.

FIG. 5 depicts estimating a probability of traffic jam in each of the lanes using lane change signals of a connected vehicle, according to one or more embodiments shown and described herein.

In FIG. 5, the connected vehicle 110 is driving on a road including lanes 501, 503, 505, 507. The connected vehicle 110 is approaching traffic jam 510. The server 240 may determine that the connected vehicle 110 is approaching traffic jam 510 based on the location of the connected vehicle 110. Although FIG. 5 depicts that the connected vehicle 110 is in the lane 503 and the traffic jam 510 is located in the lane 503, the connected vehicle 110 and the server 240 do not have information that the connected vehicle 110 and the traffic jam 510 are in the lane 503. The server 240 may monitor driving behavior of connected vehicles approaching the traffic jam section 512. For example, the server 240 received driving data from the connected vehicle 110 that the connected vehicle 110 approaching a traffic jam changes lanes to the left and accelerates and another connected vehicle approaching the traffic jam changes lanes to the right and accelerates.

Based on the driving data of connected vehicles approaching or in the traffic jam section 512, the server 240 may determine that the middle lanes 503 and 505 would have relatively higher probability of having corresponding traffic jam. Specifically, the server 240 may estimate lane-level traffic jam distribution 520 that includes a probability of traffic jam in each of the lanes 501, 503, 505, and 507. The server 240 may generate an initial lane-level traffic jam distribution that may have equal probability of traffic jam in each of the lanes 501, 503, 505, and 507 and update the initial lane-level traffic jam distribution based on the driving data of connected vehicles as they are received from the connected vehicles. For example, as more connected vehicles transmit, to the server 240, driving data indicating that corresponding vehicle in a traffic jam changes lanes to the left or right and accelerates, the probability of traffic jam in each of the middle lanes 523 and 525 relatively increases and the probability of traffic jam in each of the leftmost lane and the rightmost lane relatively decreases. The server 240 may transmit information about the updated lane-level traffic jam distribution to connected vehicles approaching the traffic jam section 512.

Figure 6:
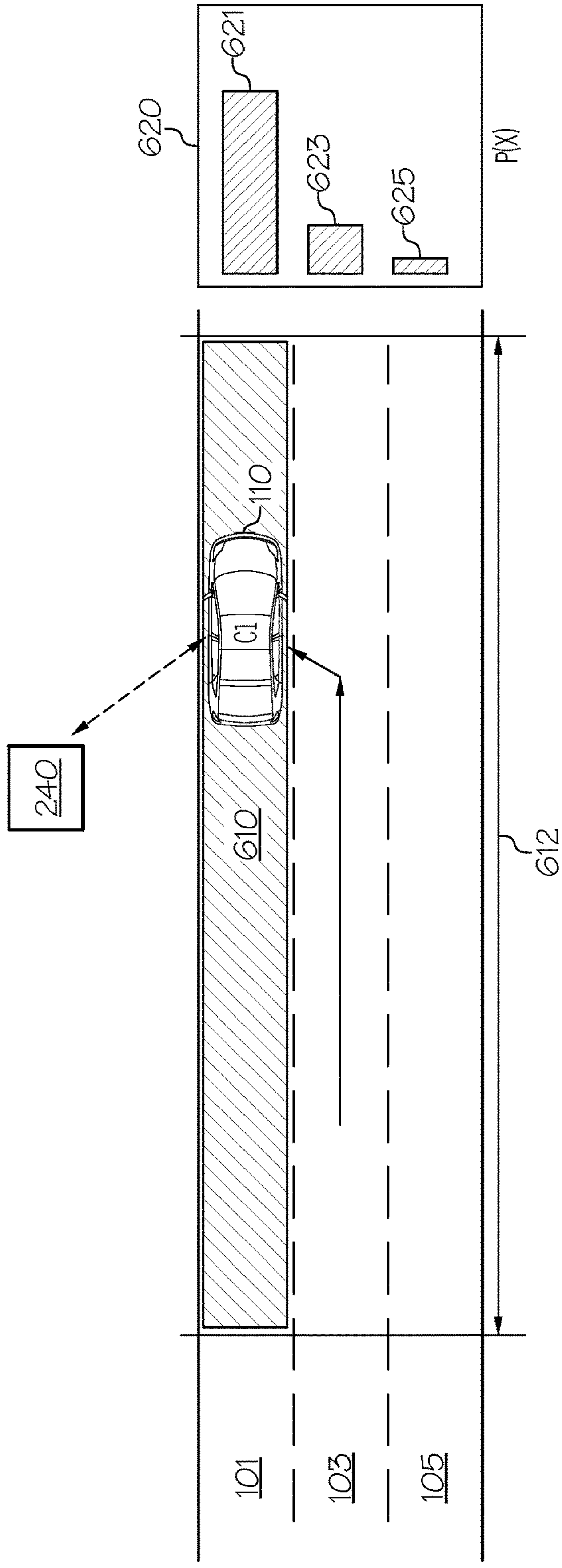
FIG. 6 depicts estimating a probability of traffic jam in each of the lanes using lane change signals of a connected vehicle, according to one or more embodiments shown and described herein.

FIG. 6 depicts estimating a probability of traffic jam in each of the lanes using lane change signals of a connected vehicle, according to one or more embodiments shown and described herein.

In FIG. 6, the connected vehicle 110 is within the traffic jam section 612, but initially drives in a normal speed. The server 240 may determine that the connected vehicle 110 is driving at a normal speed based on the speed of the connected vehicle 110. Although FIG. 6 depicts that the connected vehicle 110 is in the lane 103 and the traffic jam 610 is located in the lane 101, the connected vehicle 110 and the server 240 do not have information that the connected vehicle 110 is in the lane 103 and the traffic jam 610 is in the lane 101. The server 240 may monitor driving behavior of connected vehicles in the traffic jam section 612. For example, the server 240 receives driving data from the connected vehicle 110 that the connected vehicle 110 driving at a normal speed changes lanes to the left and decelerates. The server 240 may monitor driving behavior of other connected vehicles in the traffic jam section 420 and receive no driving data indicating that a connected vehicle changes lanes to the right and decelerates.

Based on the driving data of connected vehicles in the traffic jam section 612, the server 240 may determine that the leftmost lane would have the highest probability of having corresponding traffic jam. Specifically, the server 240 may estimate lane-level traffic jam distribution 620 that includes a probability of traffic jam in each of the lanes 101, 103, 105. The server 240 may generate an initial lane-level traffic jam distribution that may have equal probability of traffic jam in each of the lanes 101, 103, 105 and update the initial lane-level traffic jam distribution based on the driving data of connected vehicles as the driving data are received from the connected vehicles. For example, as more connected vehicles transmit, to the server 240, driving data indicating that corresponding vehicle in a traffic jam changes lanes to the left and decelerates, the probability of traffic jam in the leftmost lane 621 relatively increases and the probability of traffic jam in the rightmost lane 625 relatively decreases. As the time period, during which the server 240 does not receive any driving data indicating that corresponding vehicle changes lanes to the right and decelerates, increases, the probability of traffic jam in the middle lane 623 relatively decreases. The server 240 may transmit information about the updated lane-level traffic jam distribution to connected vehicles approaching the traffic jam section 612.

Figure 7:
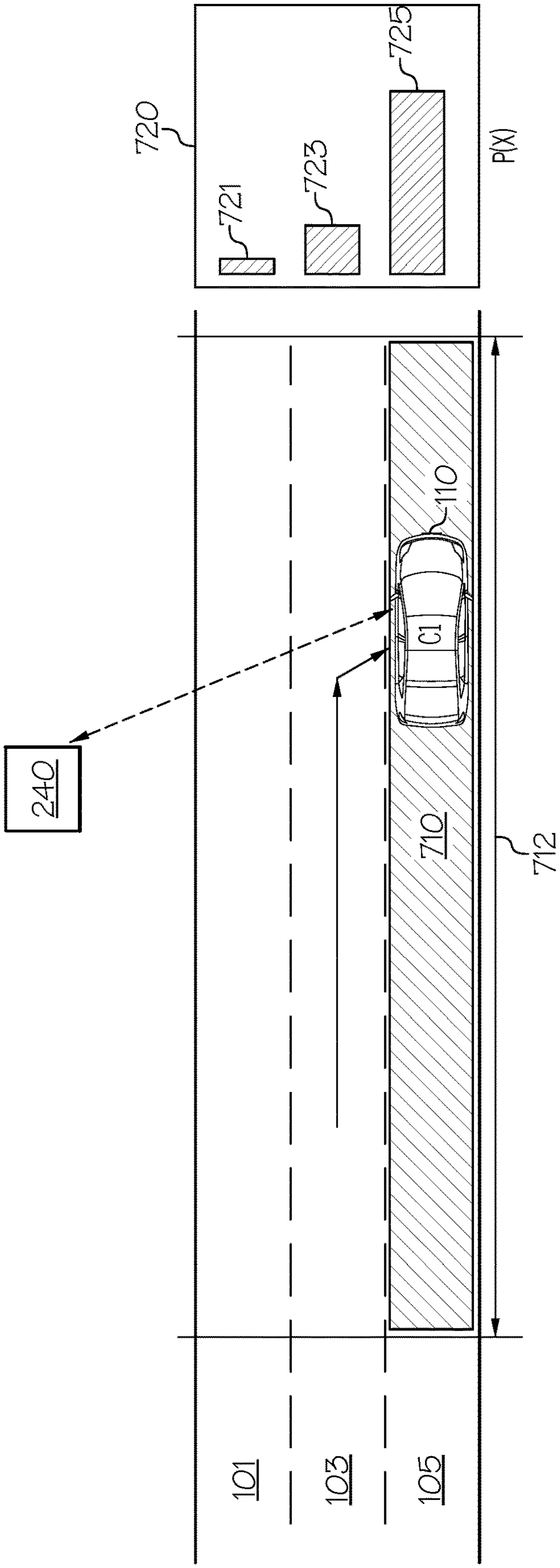
FIG. 7 depicts estimating a probability of traffic jam in each of the lanes using lane change signals of a connected vehicle, according to one or more embodiments shown and described herein.

FIG. 7 depicts estimating a probability of traffic jam in each of the lanes using lane change signals of a connected vehicle, according to one or more embodiments shown and described herein.

In FIG. 7, the connected vehicle 110 is within the traffic jam section 712, but initially drives in a normal speed. The server 240 may determine that the connected vehicle 110 is driving at a normal speed based on the speed of the connected vehicle 110. Although FIG. 7 depicts that the connected vehicle 110 is in the lane 103 and the traffic jam 710 is located in the lane 105, the connected vehicle 110 and the server 240 do not have information that the connected vehicle 110 is in the lane 103 and the traffic jam 710 is in the lane 105. The server 240 may monitor driving behavior of connected vehicles in the traffic jam section 712. For example, the server 240 received driving data from the connected vehicle 110 that the connected vehicle 110 driving at a normal speed changes lanes to the right and decelerates. The server 240 may monitor driving behavior of other connected vehicles in the traffic jam section 420 and receive no driving data indicating that a connected vehicle changes lanes to the left and decelerates.

Based on the driving data of connected vehicles in the traffic jam section 712, the server 240 may determine that the rightmost lane would have the highest probability of having corresponding traffic jam. Specifically, the server 240 may estimate lane-level traffic jam distribution 720 that includes a probability of traffic jam in each of the lanes 101, 103, 105. The server 240 may generate an initial lane-level traffic jam distribution that may have equal probability of traffic jam in each of the lanes 101, 103, 105 and update the initial lane-level traffic jam distribution based on the driving data of connected vehicles as they are received from the connected vehicles. For example, as more connected vehicles transmit, to the server 240, driving data indicating that corresponding vehicle in a traffic jam changes lanes to the right and decelerates, the probability of traffic jam in the rightmost lane 725 relatively increases and the probability of traffic jam in the leftmost lane 721 relatively decreases. As the time period, during which the server 240 does not receive any driving data indicating that corresponding vehicle changes lanes to the left and decelerates, increases, the probability of traffic jam in the middle lane 723 relatively decreases. The server 240 may transmit information about the updated lane-level traffic jam distribution to connected vehicles approaching the traffic jam section 712.

Figure 8:
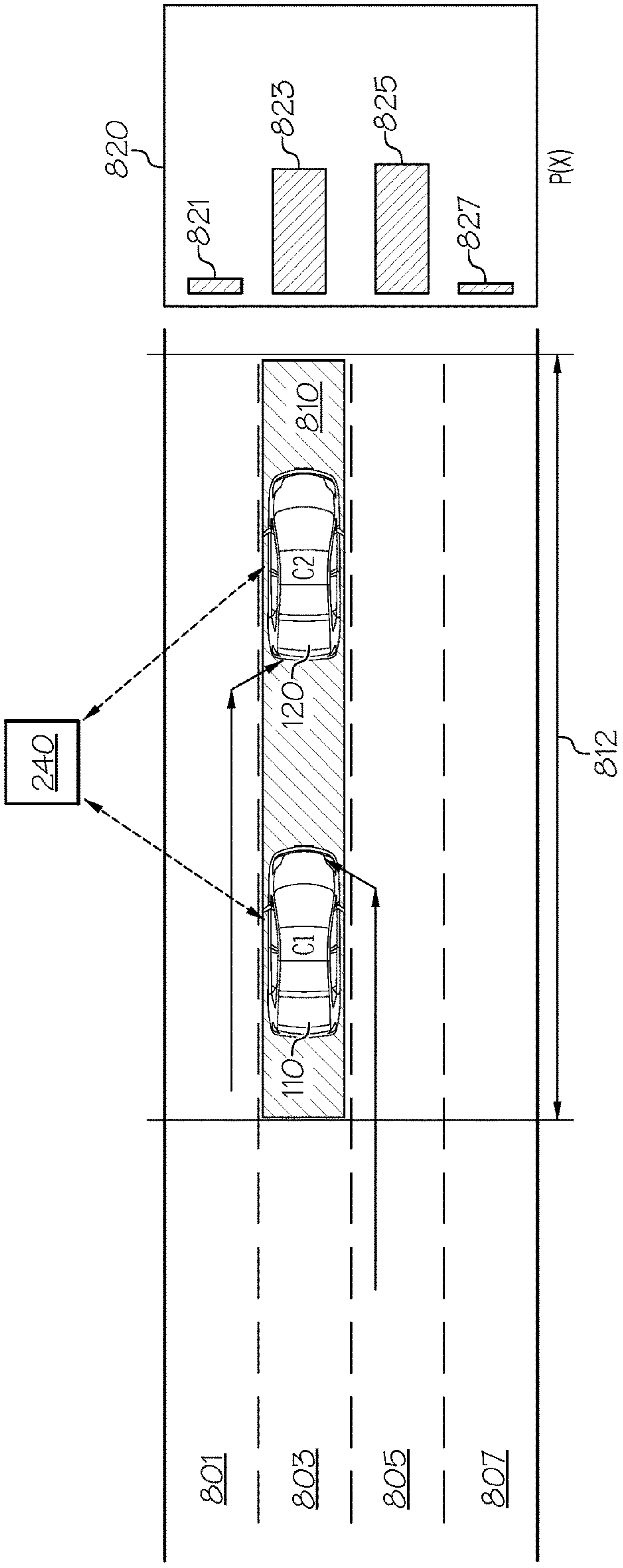
FIG. 8 depicts estimating a probability of traffic jam in each of the lanes using lane change signals of a connected vehicle, according to one or more embodiments shown and described herein.

FIG. 8 depicts estimating a probability of traffic jam in each of the lanes using lane change signals of a connected vehicle, according to one or more embodiments shown and described herein.

In FIG. 8, the connected vehicle 110 is driving on a road including lanes 801, 803, 805, 807. The connected vehicles 110 and 120 are driving at a normal speed, i.e., not in a traffic jam. The server 240 may determine that the connected vehicles 110 and 120 are driving at a normal speed based on the speed data of the connected vehicles 110 and 120. Although FIG. 8 depicts that the connected vehicle 110 was initially in the lane 805, the connected vehicle 120 was initially in the lane 801, and the traffic jam 810 is located in the lane 803, the connected vehicles 110 and 120 and the server 240 do not have information that the connected vehicle 110 is in the lane 805, the connected vehicle 120 is in the lane 801, and the traffic jam 810 is in the lane 803. The server 240 may monitor driving behavior of connected vehicles approaching or within the traffic jam section 812. For example, the server 240 receives driving data from the connected vehicle 110 that the connected vehicle 110 within the traffic jam section 812 changes lanes to the left and decelerates and the connected vehicle 120 within the traffic jam section 812 changes lanes to the right and decelerates.

Based on the driving data of connected vehicles in the traffic jam section 812, the server 240 may determine that the middle lanes 803 and 805 would have relatively higher probability of having corresponding traffic jam. Specifically, the server 240 may estimate lane-level traffic jam distribution 820 that includes a probability of traffic jam in each of the lanes 801, 803, 805, and 807. The server 240 may generate an initial lane-level traffic jam distribution that may have equal probability of traffic jam in each of the lanes 801, 803, 805, and 807 and update the initial lane-level traffic jam distribution based on the driving data of connected vehicles as they are received from the connected vehicles. For example, as more connected vehicles transmit, to the server 240, driving data indicating that corresponding vehicle in the traffic jam section 812 lanes to the left or right and decelerates, the probability of traffic jam in each of the middle lanes 823 and 825 relatively increases and the probability of traffic jam in each of the leftmost lane and the rightmost lane relatively decreases. The server 240 may transmit information about the updated lane-level traffic jam distribution to connected vehicles approaching the traffic jam section 812.

Figure 9:
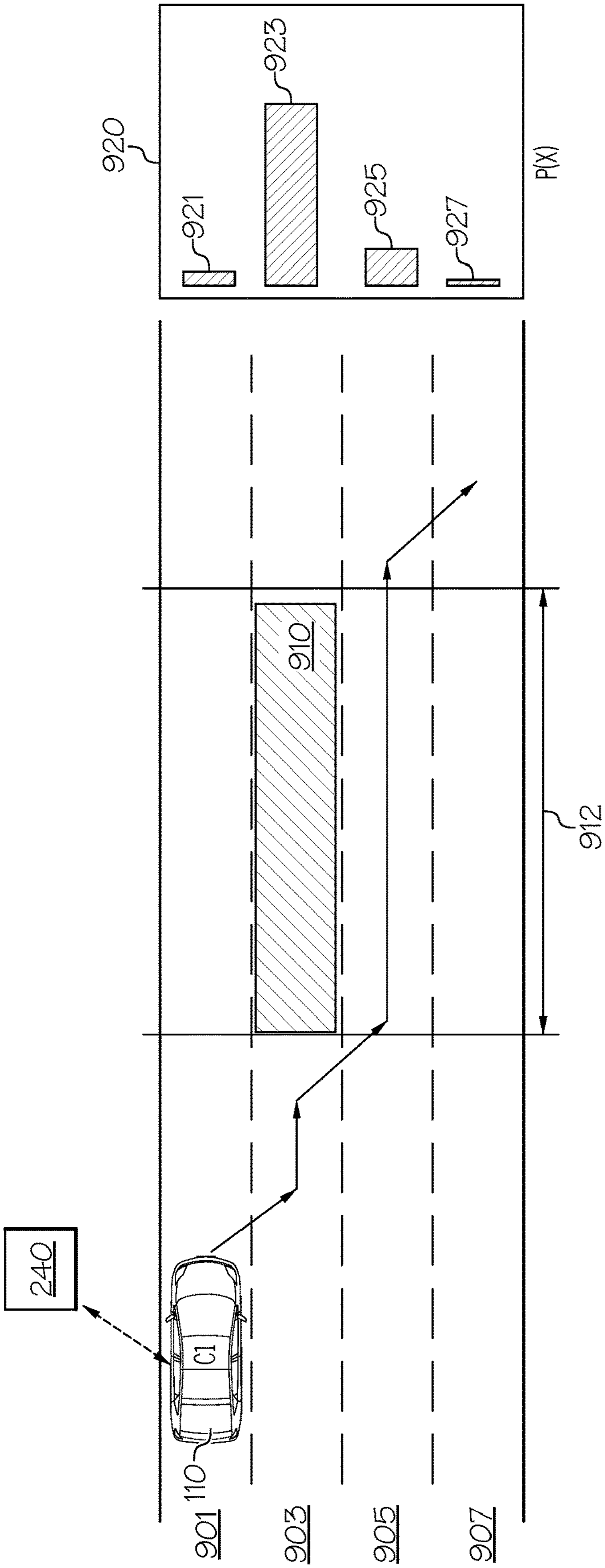
FIG. 9 depicts estimating a probability of traffic jam in each of the lanes using lane change signals of a connected vehicle, according to one or more embodiments shown and described herein.

FIG. 9 depicts estimating a probability of traffic jam in each of the lanes using lane change signals of a connected vehicle, according to one or more embodiments shown and described herein.

In FIG. 9, the connected vehicle 110 is driving on a road including lanes 901, 903, 905, 907. The connected vehicle 110 is approaching a traffic jam section 912. The server 240 may determine that the connected vehicle 110 is approaching the traffic jam section 912 based on the location of the connected vehicle 110. Although FIG. 9 depicts that the connected vehicle 110 is initially in the lane 901 and the traffic jam 910 is located in the lane 903, the connected vehicle 110 and the server 240 do not have information that the connected vehicle 110 was initially in the lane 901 and the traffic jam 910 is in the lane 903. The server 240 may monitor driving behavior of connected vehicles approaching the traffic jam section 912. For example, the server 240 received driving data from the connected vehicle 110 that the connected vehicle 110 approaching a traffic jam changes lanes to the right three times. The driving data may indicate that the connected vehicle 110 decelerates after changing lanes to the right once, changes lanes to the right one more time and accelerates.

Based on the driving data of connected vehicles approaching or in the traffic jam section 912, the server 240 may determine that the middle lane 903 would have relatively higher probability of having corresponding traffic jam. Specifically, the server 240 may estimate lane-level traffic jam distribution 920 that includes a probability of traffic jam in each of the lanes 901, 903, 905, and 907. The server 240 may generate an initial lane-level traffic jam distribution that may have equal probability of traffic jam in each of the lanes 901, 903, 905, and 907 and update the initial lane-level traffic jam distribution based on the driving data of connected vehicles as the driving data are received from the connected vehicles. For example, as more connected vehicles transmit, to the server 240, driving data indicating that corresponding vehicle changes lanes to the right three times and decelerates after the first lane change, the probability of traffic jam in the middle lane 923 relatively increases, the probability of traffic jam in another middle lane 925 decreases, and the probability of traffic jam in each of the leftmost lane and the rightmost lane decreases. This is because there are four lanes and if a connected vehicle makes three consecutive lane changes to the right, that vehicle must initially travel in the leftmost lane, i.e., the lane 901. The server 240 may transmit information about the updated lane-level traffic jam distribution to connected vehicles approaching the traffic jam section 912.

Figure 10:
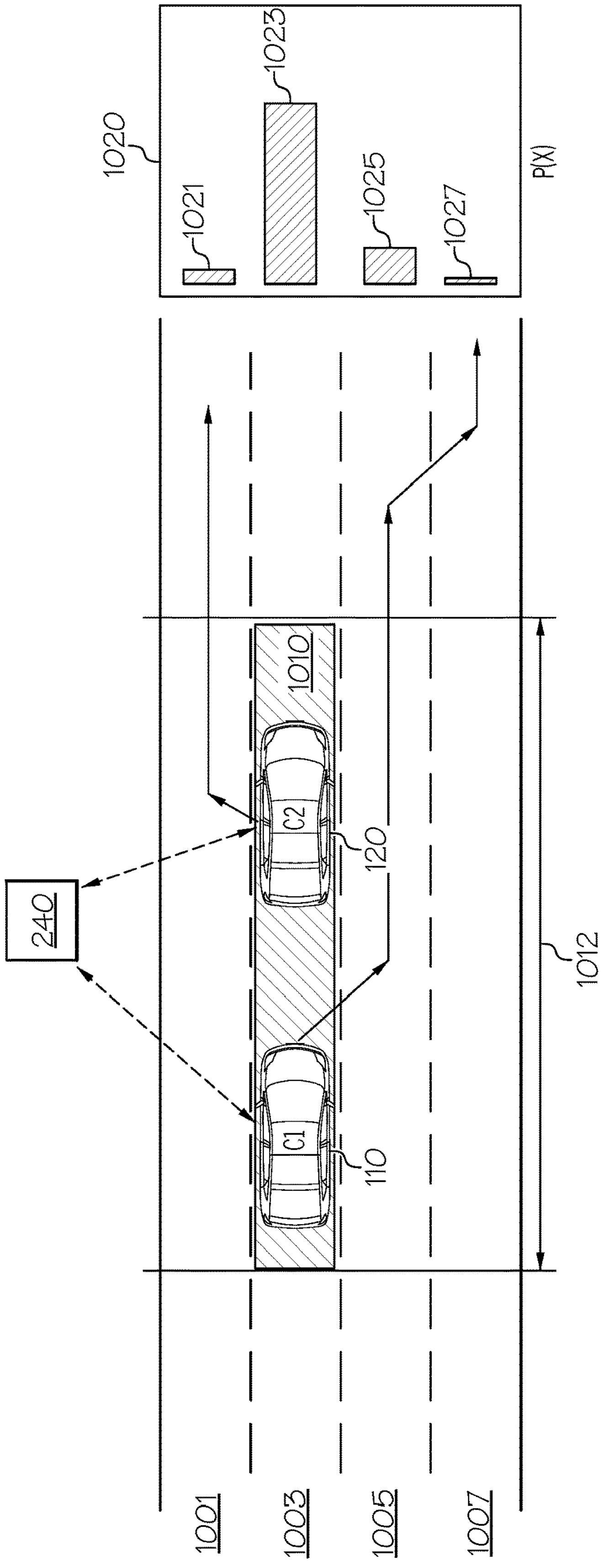
FIG. 10 depicts estimating a probability of traffic jam in each of the lanes using lane change signals of a connected vehicle, according to one or more embodiments shown and described herein.

FIG. 10 depicts estimating a probability of traffic jam in each of the lanes using lane change signals of a connected vehicle, according to one or more embodiments shown and described herein.

In FIG. 10, the connected vehicle 110 is driving on a road including lanes 1001, 1003, 1005, 1007. The connected vehicles 110 and 120 are in a traffic jam. The server 240 may determine that the connected vehicles 110 and 120 are in a traffic jam based on the speed data of the connected vehicles 110 and 120. Although FIG. 10 depicts that the connected vehicles 110 and 120 were initially in the lane 1003 and the traffic jam 1010 is located in the lane 1003, the connected vehicles 110 and 120 and the server 240 do not have information that the connected vehicles 110 and 120 are in the lane 1003 and the traffic jam 1010 are in the lane 1003. The server 240 may monitor driving behavior of connected vehicles approaching or within the traffic jam section 1012. For example, the server 240 receives driving data from the connected vehicle 110 that the connected vehicle 110 within the traffic jam section 1012 changes lanes to the right, accelerates, and changes lanes to the right again and that the connected vehicle 120 within the traffic jam section 1012 changes lanes to the left and accelerates.

Based on the driving data of connected vehicles in the traffic jam section 1012, the server 240 may determine that the middle lane 1023 would have relatively higher probability of having corresponding traffic jam. Specifically, the server 240 may estimate lane-level traffic jam distribution 1020 that includes a probability of traffic jam in each of the lanes 1001, 1003, 1005, and 1007. The server 240 may generate an initial lane-level traffic jam distribution that may have equal probability of traffic jam in each of the lanes 1001, 1003, 1005, and 1007 and update the initial lane-level traffic jam distribution based on the driving data of connected vehicles as they are received from the connected vehicles. For example, as more connected vehicles transmit, to the server 240, driving data indicating that corresponding vehicle in the traffic jam section 1012 changes lanes to the right and accelerates and that corresponding vehicle in the traffic jam section 1012 changes lanes to the left and accelerates, the probability of traffic jam in of the middle lanes 1023 and 1025 relatively increases and the probability of traffic jam in each of the leftmost lane and the rightmost lane relatively decreases. As more connected vehicles transmit, to the server 240, driving data indicating that corresponding vehicle in the traffic jam section 1012 changes lanes to the right, accelerates, and changes lanes to the right again, the probability of traffic jam in of the middle lane 1023 relatively increases and the probability of traffic jam in the middle lane 1025 relatively decreases. The server 240 may transmit information about the updated lane-level traffic jam distribution to connected vehicles approaching the traffic jam section 1012.

It should be understood that embodiments described herein are directed to methods and systems for estimating lane-level traffic jam, according to one or more embodiments shown and described herein. The system and method obtain information on lane changes of the vehicles in a road section including a traffic jam section, collect driving data of the vehicles after the lane changes, estimate lane-level traffic jam distribution of the plurality of lanes of the road section based on the information on the lane changes and the driving data, and transmit the lane-level traffic jam distribution to vehicles approaching the traffic jam section.

According to the present disclosure, the present system identifies lane ID of a traffic jam by analyzing changes in connected vehicles states, e.g., from a congested state to a free flow state, and tracking lane changes of the connected vehicles in a road segment. The present system identifies lane ID of a traffic jam without requiring lane ID of vehicles.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system comprising:

one or more processors programmed to:

obtain information on lane changes of a plurality vehicles in a road section including a traffic jam section, the road section including a plurality of lanes;

collect driving data of the vehicles after the lane changes;

estimate lane-level traffic jam distribution of the plurality of lanes based on the information on the lane changes and the driving data;

transmit the lane-level traffic jam distribution to vehicles approaching the traffic jam section; and obtain information that a vehicle of the plurality vehicles in the road section including the traffic jam section moved to a right lane;

obtain information that the vehicle of the plurality vehicles in the road section including the traffic jam section accelerated after moving to the right lane;

in response to obtaining the information that the vehicle of the plurality vehicles in the road section including the traffic jam section moved to the right lane and obtaining the information that the vehicle of the plurality vehicles in the road section including the traffic jam section accelerated after moving to the right lane, increase a probability of traffic jam in a leftmost lane of the plurality of lanes; and control a vehicle that is other than the plurality vehicles in the road section including the traffic jam section to avoid the leftmost lane of the plurality of lanes.

2. The system of claim 1, wherein the lane-level traffic jam distribution includes a probability of traffic jam in each of the plurality of lanes.

3. The system of claim 1, wherein the one or more processors are further programmed to:

obtain information that no vehicle in the traffic jam moved to a left lane and accelerated during a predetermined period of time; and increase the probability of traffic jam in the leftmost lane of the plurality of lanes based on the information that no vehicle in the traffic jam moved to a left lane and accelerated during the predetermined period of time.

4. The system of claim 2, wherein the one or more processors are further programmed to:

identify a vehicle in a traffic jam;

obtain information that the vehicle moved to a left lane and accelerated; and increase the probability of traffic jam in a rightmost lane of the plurality of lanes based on the information that the vehicle moved to the left lane and accelerated.

5. The system of claim 2, wherein the one or more processors are further programmed to:

identify a first vehicle and a second vehicle in a traffic jam;

obtain information that the first vehicle moved to a left lane and accelerated;

obtain information that the second vehicle moved to the right lane and accelerated; and increase the probability of traffic jam in one or more middle lanes of the plurality of lanes based on the information that the first vehicle moved to the left lane and accelerated and the second vehicle moved to the right lane and accelerated.

6. The system of claim 2, wherein the one or more processors are further programmed to:

identify a vehicle not in a traffic jam;

obtain information that the vehicle moved to a left lane and decelerated; and increase the probability of traffic jam in the leftmost lane of the plurality of lanes based on the information that the vehicle moved to the left lane and decelerated.

7. The system of claim 2, wherein the one or more processors are programmed to:

identify a vehicle not in a traffic jam;

obtain information that the vehicle moved to the right lane and decelerated; and increase the probability of traffic jam in a rightmost lane of the plurality of lanes based on the information that the vehicle moved to the right lane and decelerated.

8. The system of claim 2, wherein the one or more processors are programmed to:

identify a first vehicle and a second vehicle not in a traffic jam;

obtain information that the first vehicle moved to a left lane and decelerated;

obtain information that the second vehicle moved to the right lane and decelerated; and increase the probability of traffic jam in one or more middle lanes of the plurality of lanes based on the information that the first vehicle moved to the left lane and decelerated and the second vehicle moved to the right lane and decelerated.

9. The system of claim 2, wherein the one or more processors are programmed to:

obtain a number of lane changes by a vehicle before the vehicle enters a traffic jam;

obtain a number of lane changes by the vehicle after the vehicle enters the traffic jam; and adjust the lane-level traffic jam distribution based on the number of lane changes by the vehicle before the vehicle enters the traffic jam and the number of lane changes by the vehicle after the vehicle enters the traffic jam.

10. The system of claim 2, wherein the one or more processors are programmed to:

identify a vehicle in a traffic jam;

obtain a number of lane changes by the vehicle after being in the traffic jam and a direction of the lane changes; and adjust the lane-level traffic jam distribution based on the number of lane changes by the vehicle after being in the traffic jam and the direction of the lane changes.

11. The system of claim 2, wherein the one or more processors are programmed to:

identify a first vehicle and a second vehicle in a traffic jam;

obtain a number of lane changes to a left direction by the first vehicle after being in the traffic jam;

obtain a number of lane changes to a right direction by the second vehicle after being in the traffic jam; and adjust the lane-level traffic jam distribution based on the number of lane changes to the left direction by the first vehicle after being in the traffic jam and the number of lane changes to the right direction by the second vehicle after being in the traffic jam.

12. The system of claim 1, wherein the driving data includes acceleration or deceleration of the vehicles.

13. A method for determining a lane-level traffic jam, the method comprising:

obtaining information on lane changes of a plurality of vehicles in a road section including a traffic jam section, the road section including a plurality of lanes;

collecting driving data of the vehicles after the lane changes;

estimating lane-level traffic jam distribution of the plurality of lanes based on the information on the lane changes and the driving data;

identifying a lane with a traffic jam based on the lane-level traffic jam distribution;

transmitting information on the identified lane to vehicles approaching the traffic jam section;

obtaining information that a vehicle of the plurality vehicles in the road section including the traffic jam section moved to a right lane;

obtaining information that the vehicle of the plurality vehicles in the road section including the traffic jam section accelerated after moving to the right lane;

in response to obtaining the information that the vehicle of the plurality vehicles in the road section including the traffic jam section moved to the right lane and obtaining the information that the vehicle of the plurality vehicles in the road section including the traffic jam section accelerated after moving to the right lane, increasing a probability of traffic jam in a leftmost lane of the plurality of lanes; and controlling a vehicle that is other than the plurality vehicles in the road section including the traffic jam section to avoid the leftmost lane of the plurality of lane.

14. The method of claim 13, wherein the lane-level traffic jam distribution includes a probability of traffic jam in each of the plurality of lanes.

15. The method of claim 14, further comprising:

identifying a first vehicle and a second vehicle in a traffic jam;

obtaining information that the first vehicle moved to a left lane and accelerated;

obtaining information that the second vehicle moved to a right lane and accelerated; and increasing the probability of traffic jam in one or more middle lanes of the plurality of lanes based on the information that the first vehicle moved to the left lane and accelerated and the second vehicle moved to the right lane and accelerated.

16. The method of claim 14, further comprising:

identifying a vehicle not in a traffic jam;

obtaining information that the vehicle moved to a left lane and decelerated; and increasing the probability of traffic jam in a leftmost lane of the plurality of lanes based on the information that the vehicle moved to the left lane and decelerated.

17. The method of claim 14, further comprising:

identifying a first vehicle and a second vehicle not in a traffic jam;

obtaining information that the first vehicle moved to a left lane and decelerated;

obtaining information that the second vehicle moved to a right lane and decelerated; and increasing the probability of traffic jam in one or more middle lanes of the plurality of lanes based on the information that the first vehicle moved to the left lane and decelerated and the second vehicle moved to the right lane and decelerated.

18. The method of claim 14, further comprising:

obtaining a number of lane changes by a vehicle before the vehicle enters a traffic jam;

obtaining a number of lane changes by the vehicle after the vehicle enters the traffic jam; and adjusting the lane-level traffic jam distribution based on the number of lane changes by the vehicle before the vehicle enters the traffic jam and the number of lane changes by the vehicle after the vehicle enters the traffic jam.

* * * * *